(No Model.) 5 Sheets—Sheet 1.
G. LANGER.
MACHINE FOR FORMING NUT LOCKS.
No. 587,149. Patented July 27, 1897.
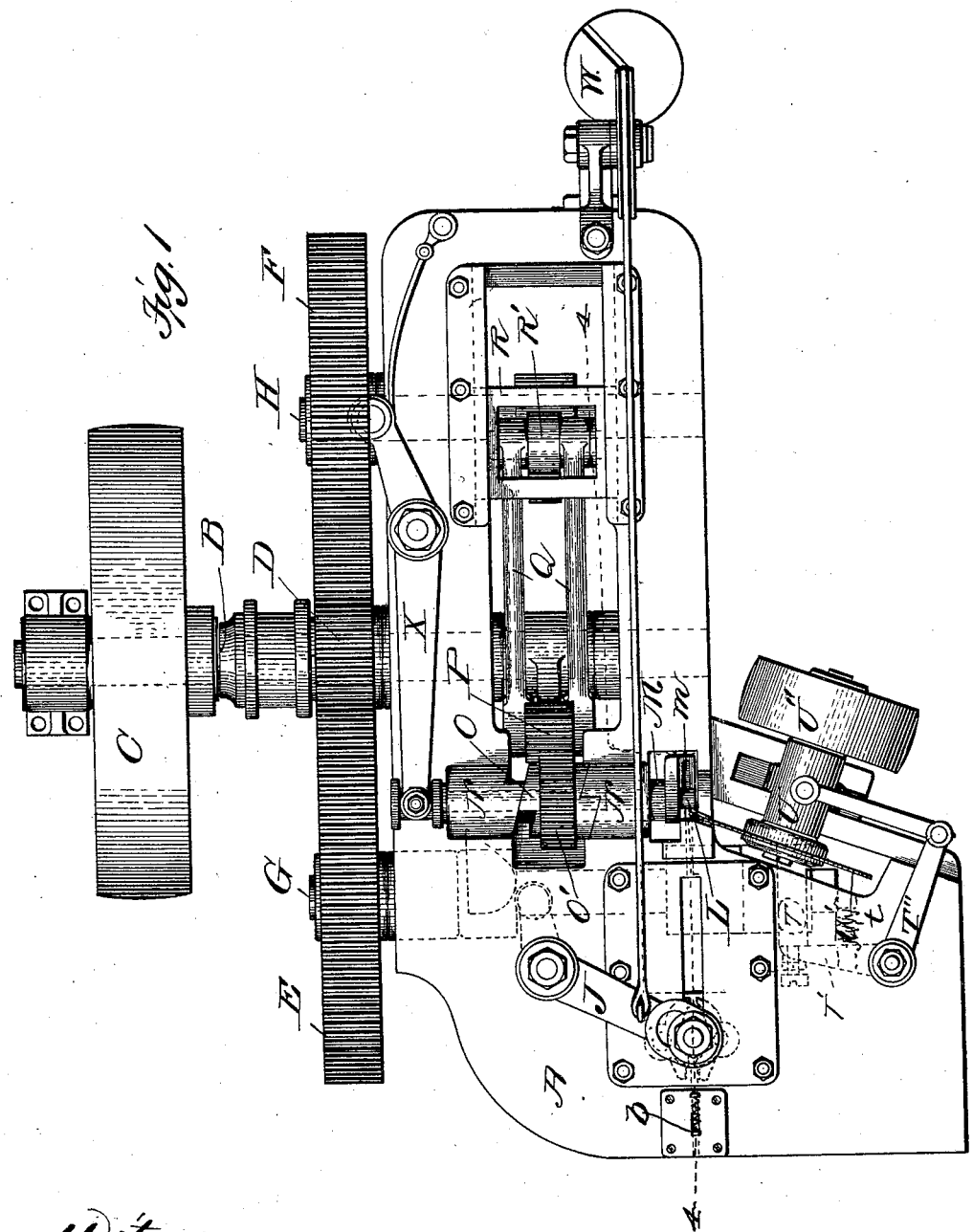
Witnesses:
G. A. Pennington
Inventor
Gotthold Langer
by Paul Bakewell
his atty.

(No Model.)  5 Sheets—Sheet 2.
G. LANGER.
MACHINE FOR FORMING NUT LOCKS.
No. 587,149.  Patented July 27, 1897.
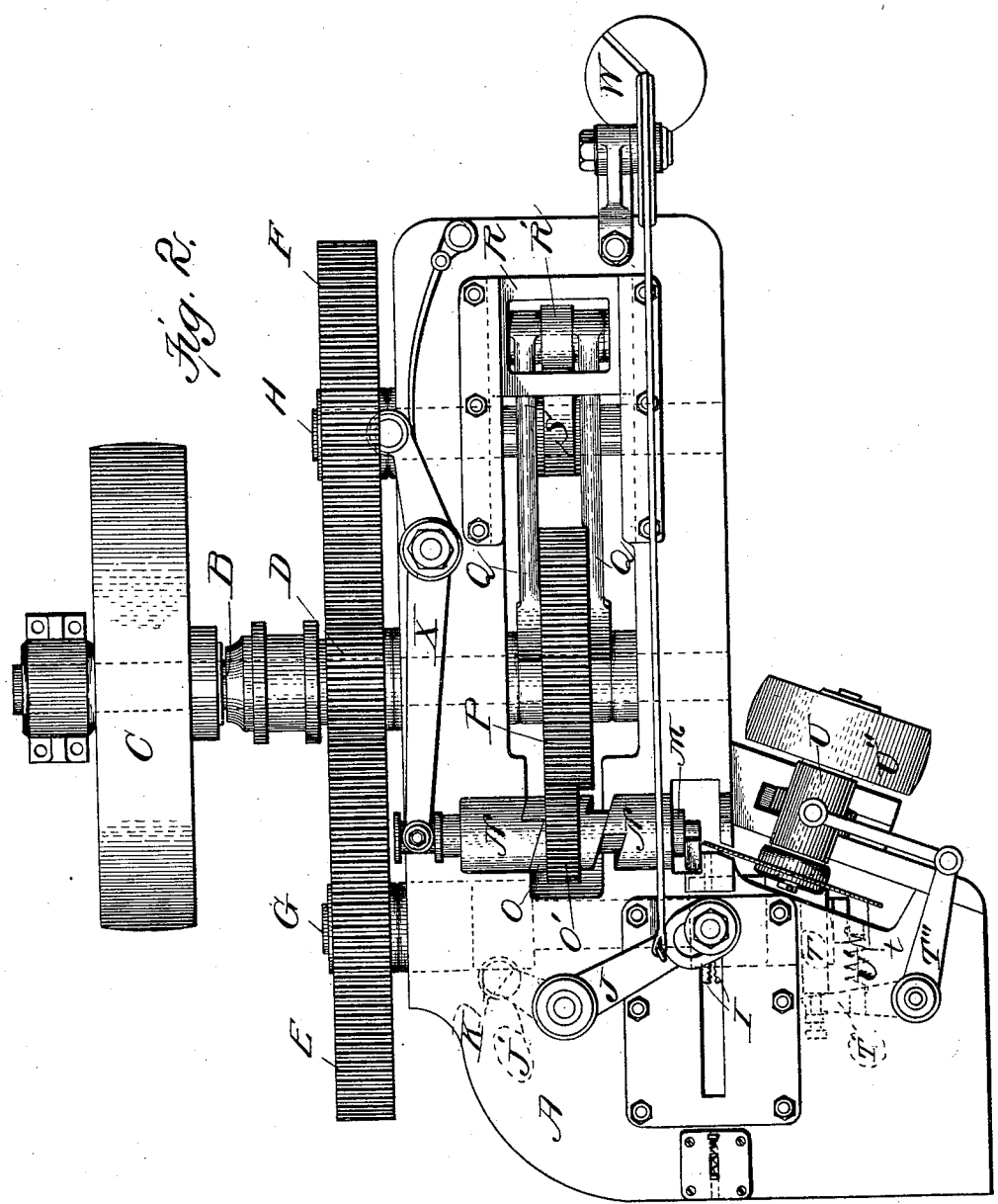
Witnesses:
G. A. Pennington
F. R. Cornwall
Inventor
Gotthold Langer
by Paul Bakewell
his atty (No Model.) 5 Sheets—Sheet 3.
G. LANGER.
MACHINE FOR FORMING NUT LOCKS.
No. 587,149. Patented July 27, 1897.
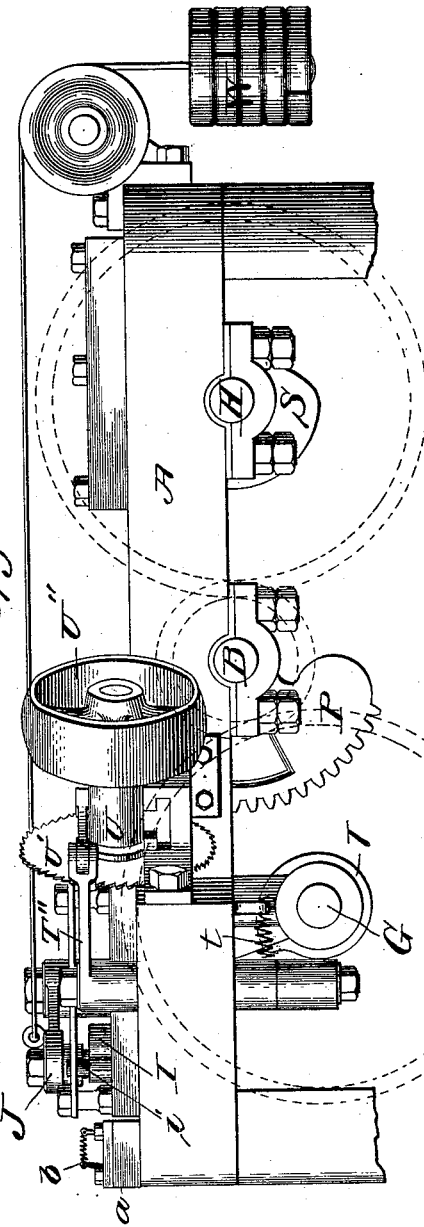
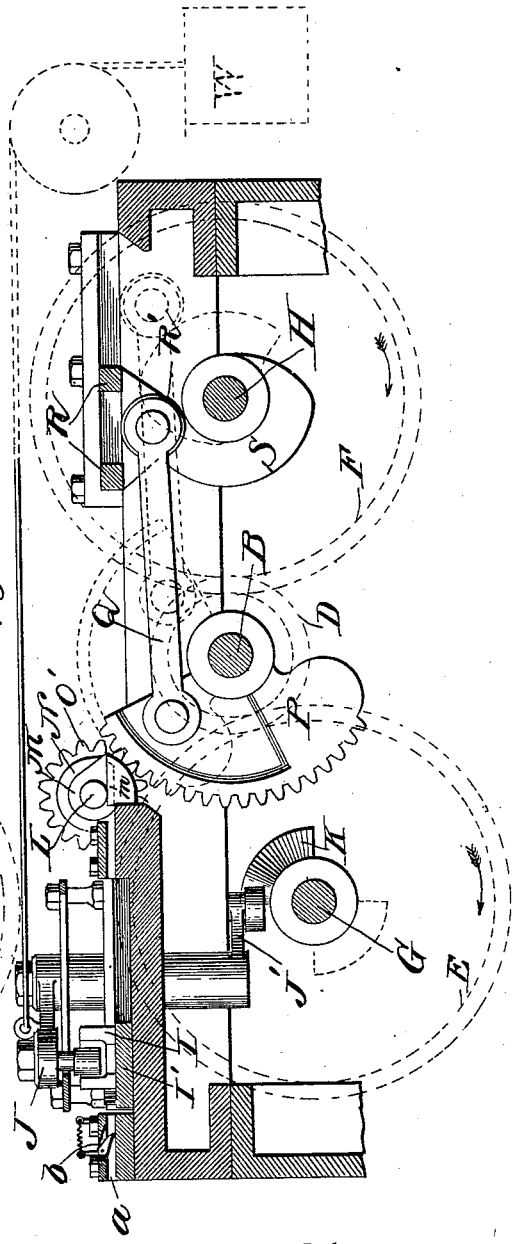
Witnesses:
G. A. Pennington
F. R. Cornwall
Inventor
Gotthold Langer
by Paul Bakewell
his atty

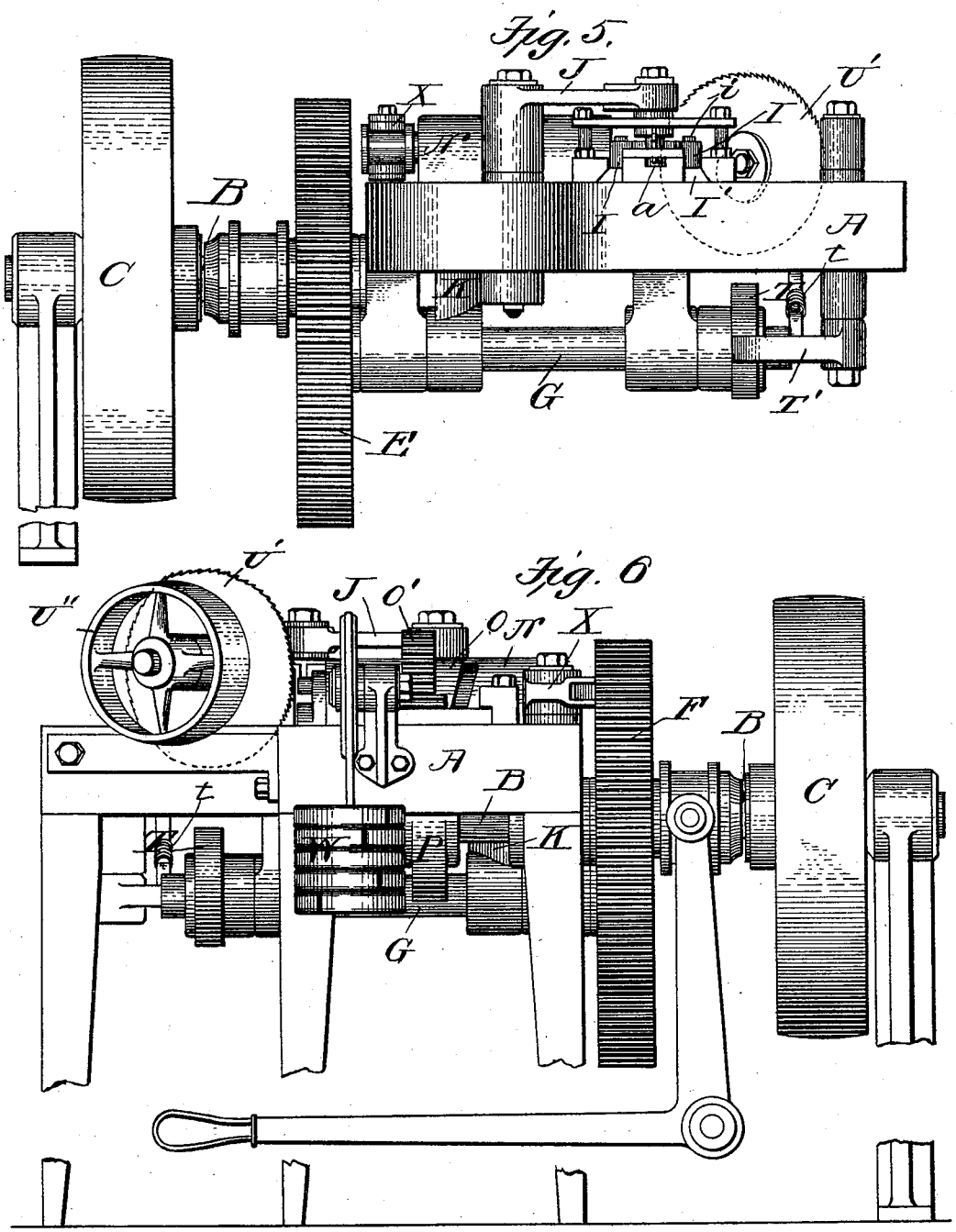

(No Model.) 5 Sheets—Sheet 5.

G. LANGER.
MACHINE FOR FORMING NUT LOCKS.

No. 587,149. Patented July 27, 1897.

Witnesses:
G. A. Pennington
F. R. Cornwall

Inventor
Gotthold Langer
by Paul Bakewell
his atty.

THE NORRIS PETERS CO., PHOTO-LITHO., WASHINGTON, D. C.

UNITED STATES PATENT OFFICE.

GOTTHOLD LANGER, OF ST. LOUIS, MISSOURI, ASSIGNOR TO THE AMERICAN BRAKE BEAM COMPANY, OF CHICAGO, ILLINOIS.

MACHINE FOR FORMING NUT-LOCKS.

SPECIFICATION forming part of Letters Patent No. 587,149, dated July 27, 1897.

Application filed January 22, 1897. Serial No. 620,169. (No model.)

*To all whom it may concern:*

Be it known that I, GOTTHOLD LANGER, a citizen of the United States, residing at the city of St. Louis, State of Missouri, have invented a certain new and useful Improvement in Machines for Forming Nut-Locks, of which the following is a full, clear, and exact description, reference being had to the accompanying drawings, forming a part of this specification, in which—

Figure 7:
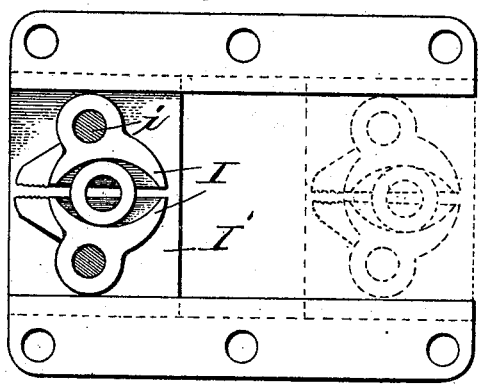
Figure 8:
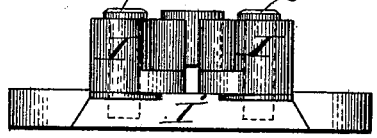
Figure 9:
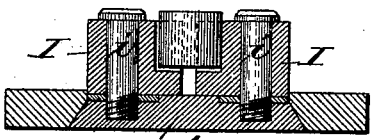
Figure 16:
Figure 17:
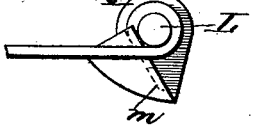
Figures 18, 19:

Figure 1 is a top plan view of my improved machine. Fig. 2 is a similar view showing the parts in different positions from what they occupy in Fig. 1. Fig. 3 is a side elevational view. Fig. 4 is a sectional view on line 4 4, Fig. 1. Fig. 5 is an end elevational view looking at the front or feed end of the machine. Fig. 6 is an end elevational view looking at the rear end of the machine. Fig. 7 is a plan view of the gripper-jaws for feeding the material to the machine. Fig. 8 is an elevational view of the gripper-jaws. Fig. 9 is a cross-sectional view of the gripper-jaws. Figs. 10 to 13, inclusive, are top plan views of the nut-lock-forming mechanism. Figs. 14 to 17, inclusive, are end elevational views of said forming mechanism, the position shown in said figures corresponding to the plan views immediately above them. Figs. 18 and 19 are end elevational and plan views of a nut-lock formed by my improved machine.

This invention relates to a new and useful improvement in machines for forming nut-locks of the character shown in Figs. 18 and 19—that is, said nut-lock has a straight portion extending tangentially from a helically-curved ring portion, which ring terminates just short of the tangential portion.

The invention consists in the construction and operation of the gripping-jaws which coöperate with the forming mechanism to feed the material to said forming mechanism; in the construction and operation of the forming mechanism and the saw which coöperates therewith; in the arrangement and combination of the several actuating-cams which operate the gripping-jaws, the forming mechanism, and the saw; and, finally, the invention consists in the construction, arrangement, and combination of the several parts, all as will hereinafter be described and afterward pointed out in the claims.

In the drawings, A indicates the bed-plate of the machine, which is preferably supported by legs to raise said bed-plate from the floor.

B indicates a shaft extending transversely the machine and having a driving-pulley C mounted on its end. D indicates a pinion mounted on said shaft B, which pinion meshes with gears E and F, which gears are mounted upon shafts G and H, respectively.

Figures 10, 11, 12, 13:
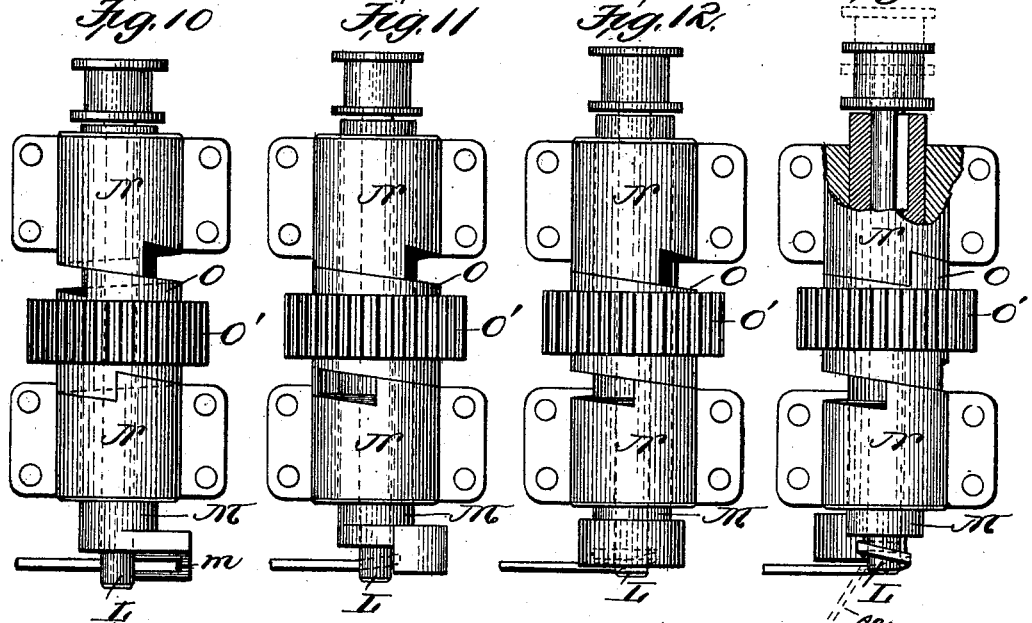
Figure 14:
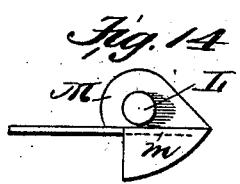

The machine is adapted to be placed adjacent to a furnace, from which the material to be formed is taken in a heated condition. The material in leaving the furnace passes through a guide-opening $a$ and under a catch $b$, which catch will permit the feeding of the material into the machine, but prevent its withdrawal. From the opening $a$ the material passes between two gripping-jaws I, whose construction is more clearly shown in Figs. 7, 8, and 9. These gripping-jaws are pivoted on studs $i$, mounted in a sliding plate I', running in suitable ways secured to the bed-plate of the machine. The gripping-jaws are recessed on their inner faces, and a roller or bolt secured to a rock-arm J extends into said recesses between the gripping-jaws. Rock-arm J is secured to a vertically-disposed rock-shaft mounted in the bed-plate of the machine, on the lower end of which rock-shaft is arranged an arm J', having a roller on its outer end, which roller coöperates with a side-faced cam K, secured on the shaft G. The tendency of the arm J is to normally move inwardly toward the forming mechanism, which tendency is the result of either a spring or a weight, the latter being shown and designated as W. By reason of the bolt or roller on the end of arm J extending between the gripping-jaws I to the inside of their pivotal points it will be seen, by reference to Fig. 7, that as said arm moves inwardly said roller or bolt will engage the rear curved faces of the recesses of the gripping-jaws, causing the gripping-teeth on the front end of the jaws to close upon the material, the weight or spring keeping the gripping-jaws so closed upon the material and pulling the material into the forming mechanism. When a nut-lock is formed and severed, the cam K will engage the roller on arm J' and move the gripping-jaws from the position shown in Fig. 2 to the position shown in Fig. 1. During this movement of the arm J the gripping-jaws will be opened to release the material until the cam shall have passed the roller on arm J', when the weight will then be operative to move the arm J inwardly and close the gripping-jaws on the material. The material thus being in advance of the gripping-jaws will be forced under a spindle L and into a pocket $m$, formed in the face of a projection on the end of a sleeve M, surrounding the spindle L. This sleeve and spindle are preferably provided with longitudinally-disposed grooves in which is arranged a feather, as shown in Fig. 13, so as to permit independent longitudinal movement of either the sleeve or spindle, their rotary movement being in unison.

N indicates bearings on the bed-plate of the machine, the inner faces of which bearings are formed as cams.

O indicates a cam secured to the sleeve M and coöperating with the cam-faces of bearings N.

O' indicates a pinion conjoined to the cam O.

P indicates a segment loosely mounted upon the shaft B and in mesh with pinion O'.

Q are links secured to segment P, the other ends of said links being mounted in a sliding carriage R and carrying between them a roller R', which coöperates with a cam S, mounted on the shaft H. Suitable ways are provided for the carriage R.

Figure 15:

Assuming the parts to be in the position shown in Fig. 1, which position is also shown in Fig. 10, the gripping-jaws will force the material into the groove or pocket $m$ and under the spindle L. The material will be arrested when it reaches the end of the pocket. When the material has reached this position, cam S will catch roller R' and force the carriage R, links Q, and segment P to the position shown in dotted lines in Fig. 4 and in full lines in Fig. 2. This movement of these parts is speeded to the desired speed, and as the segment is in mesh with pinion O' it follows that a rotary movement is communicated to the sleeve M, which twists the material, as shown in Figs. 15, 16, and 17. Cam O also causes the sleeve M to move longitudinally, which imparts to the turning nut-lock a helical twist. After the nut-lock is thus formed the cam T on shaft G moves a rock-arm T', which is connected to the arm T''' and causes the reciprocation of a saw-carriage U, which carries a saw U', said saw being driven from any suitable source of power, but preferably by a belt running from above and under a pulley U'''.

When the nut-lock has been severed, a side-faced cam on gear F operates a lever X, which lever is connected to spindle L and causes the end of said spindle to be withdrawn in the sleeve M and from the finished nut-lock, permitting said nut-lock to drop beneath the machine.

The cams and their associate parts are timed relative to each other in the following order when the machine operates to form a nut-lock: Assuming the parts to be in the position shown in Fig. 1 and the material in the forming mechanism being fully seated in the pocket $m$, cam K has released arm J' and weight W now tends to feed material, through the medium of the gripping-jaws, to the forming mechanism. Cam S, as shown in Fig. 4, will immediately operate on roller R', and through the medium of the links and segment rotate sleeve M, and by reason of the cams on the bearings N sleeve M will also be moved longitudinally or lengthwise. Cam S, after the nut-lock is formed, will hold the parts stationary, while cam T reciprocates the saw-carriage and severs the formed nut-lock, withdrawing the saw-carriage immediately after such severance by means of a spring $t$, which spring also holds the end of arm T' against the face of cam T. Lever X now operates to withdraw the spindle from the nut-lock, and by the time that cam S is again in the position shown in Fig. 4 cam K will have operated the arms J' and J to cause the gripping-jaws to take new material for the next operation. Segment P is weighted at its lower end and will return the parts connected therewith to an operative position when the cam S releases the roller R'. The spindle L is withheld a sufficient length of time to enable the forming mechanism to reverse back to its normal position, which reverse movement will discharge the severed and finished nut-lock.

I am aware that many minor changes in the construction, arrangement, and combination of the several parts of my machine can be made and substituted for those herein shown and described without in the least departing from the nature and principle of the invention.

Having thus described my invention, what I claim, and desire to secure by Letters Patent of the United States, is—

1. In a nut-lock-forming machine, the combination with the forming mechanism, of a feeding device which grips and yieldingly feeds the material to the forming mechanism when said forming mechanism is operatively forming a nut-lock, a tension on said gripping and feeding device, and means for overcoming said tension and releasing the jaws thereof, said means also moving the gripping and feeding device to a position where it can get a new hold on the material to be fed to the forming mechanism; substantially as described.

2. In combination with a feeding mechanism which yieldingly feeds the material to the bending mechanism, a bending mechanism comprising a grooved revoluble member which also moves longitudinally its axis of rotation, and a mandrel slidingly mounted relative to said grooved revoluble member, and a saw for severing the bent and finished article; substantially as described.

3. The combination with the forming mechanism, of two pivoted gripping-jaws having concaved recesses in their inner faces, and a stud or roller extending between said gripping-jaws and coöperating with said concaved recesses; substantially as described.

4. The combination with the revoluble member of the forming mechanism, which is provided with a groove tangentially disposed to the axis of rotation of said member, said groove being closed at one end to gage the length of material fed therein, and a mandrel which coöperates with said grooved member.

5. The combination with a sleeve having a pocketed projection on its end, a spindle mounted in said sleeve and extending beyond said projection, and means for causing a rotary and longitudinal movement of said sleeve; substantially as described.

6. The combination with a sleeve having a pocketed projection on its end, a spindle mounted in said sleeve and extending beyond said projection, a cam for moving said sleeve longitudinally, a pinion for imparting a rotary movement to the sleeve, and means for moving the spindle lengthwise the sleeve, and independently of the longitudinal movement of the sleeve; substantially as described.

7. The combination with the forming mechanism comprising a sleeve, a pocketed projection on the end of the sleeve, and a movable spindle within the sleeve, of a cam arranged on the sleeve, a pinion conjoined with the cam, a weighted segment coöperating with the pinion, a sliding carriage, links connecting the segment and carriage, and a cam for sliding said carriage; substantially as described.

8. The combination with the feeding mechanism, of the bending mechanism, an independently-movable saw for severing the bent article, and means for automatically moving said saw into and out of operative position; substantially as described.

9. The combination with the feeding mechanism, of a bending mechanism, a reciprocating saw-carriage, a saw mounted in said carriage for severing the finished article, and cams for operating said parts at the proper time; substantially as described.

10. In a machine for forming nut-locks, the combination with the gripping and feeding device, of a forming mechanism comprising a sleeve having a pocketed projection on its end, a spindle within the sleeve, means for causing a longitudinal and rotary movement of the sleeve, a saw which is operated to sever the material after the sleeve has completed its rotary movement in one direction, and a lever for withdrawing the spindle in the sleeve after the saw has severed the material; substantially as described.

11. The combination with a supporting-plate slidingly mounted in suitable guides, of a pair of oppositely-disposed gripping-jaws mounted on said plate, and means for reciprocating said plate and its carried gripping-jaws, said means operating between the jaws for opening and closing the same; substantially as described.

12. The combination with a rotary hollow shaft, of a grooved projection arranged on the end thereof and to one side of the axis of rotation of said shaft, said groove being closed at that end farthest from the axis of rotation, whereby, when material is fed therein, it is arrested by said closed end of the groove, and a mandrel slidingly arranged in said hollow shaft; substantially as described.

13. The combination with a rotatory member having a grooved projection arranged to one side of its axis of rotation, an axially-disposed spindle or mandrel which projects over the inner end of the groove, a feeding mechanism for delivering the material in said groove to be operated upon, and means for revolving said grooved projection around the mandrel; substantially as described.

14. The combination with a hollow rotatory member having a grooved projection arranged to one side of its axis of rotation, an axially-disposed spindle or mandrel which projects over the inner end of said groove, means for withdrawing said mandrel within the hollow rotating member when the material has been formed and severed, a saw for severing the formed material, and means for moving said saw into and out of operative relation to the material being operated upon; substantially as described.

In testimony whereof I hereunto affix my signature, in presence of two witnesses, this 2d day of January, 1897.

GOTTHOLD LANGER.

Witnesses:
F. R. CORNWALL,
HUGH K. WAGNER.